INVENTORS
Stuart P. Jackson
Kenneth A. Wallace
BY Dennis M. Swing
Anthony D. Cennamo

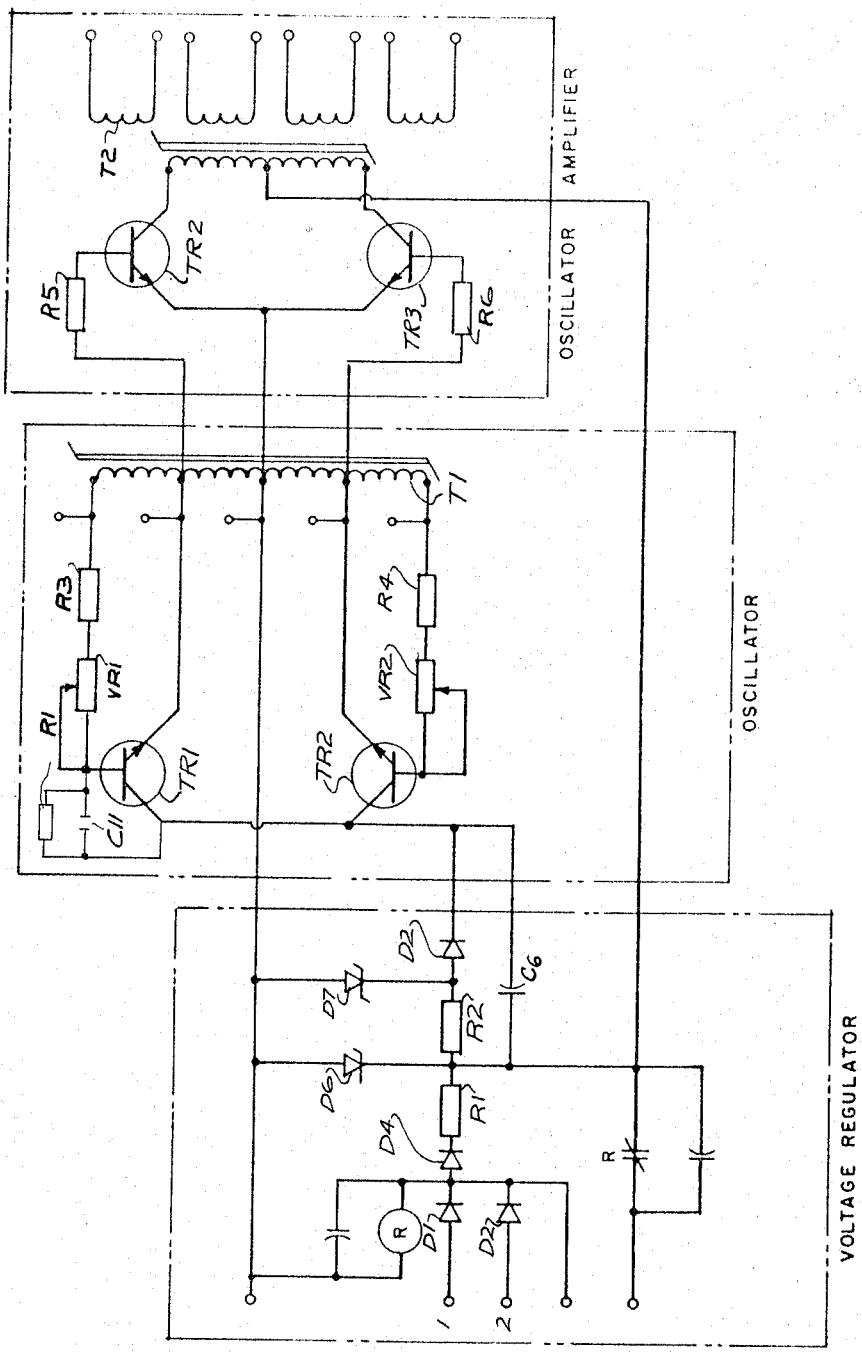
FIG. 5 SQUARE WAVE OSCILLATOR

United States Patent Office 3,382,456
Patented May 7, 1968

3,382,456
INVERTER CIRCUIT HAVING AN OSCILLATOR-AMPLIFIER WITH FEEDBACK
Stuart P. Jackson, 1723 Grace Lane 43221; Dennis M. Swing, 1745 Newfield Road 43209; and Kenneth A. Wallace, 2631 Muskingum Court 43210, all of Columbus, Ohio
Filed Oct. 20, 1965, Ser. No. 499,102
4 Claims. (Cl. 331—113)

ABSTRACT OF THE DISCLOSURE

This invention is directed to an inverter circuit having an oscillator-amplifier with feedback. Specifically, the improvement comprises gapping the oscillator core to assure that its residual flux is that of the output transformer; and further the circuit of the present invention comprises increasing the initial, i.e., startup, frequency of the oscillator.

---

Standby power sources in the form of batteries or engine driven generators or alternators are frequently used in systems having loads which must be energized during a failure of commercial power. If these loads contain A-C motors, instruments, fluorescent lights or control components designed for A-C operation, an inverter must be employed within the standby source. Two types of standby systems may be defined on the basis of the desired transfer characteristics. They are: (1) between failure of the primary power source and substitution of the secondary source, a brief time interval may exist (for switching, starting an engine or gas turbine, etc.), and (2) no cessation of load power may be tolerated during power transfer and no major waveform transient is tolerable.

The first systems may employ static inverters because of low maintenance and high efficiency even in the face of higher first cost. The second system is more satisfactorily handled by continuous operation of the static inverter because of the high efficiency or because of the extremely fast switching of solid state devices.

Both batteries and engine driven generators or engine driven alternators are utilized as secondary sources. For instantaneous switching of power sources a battery must be employed even if an engine driven alternator is utilized as secondary source. The battery serves to provide energy to the system while the engine is being started and brought up to operating speed.

Phase changing becomes quite simple utilizing the static inverter. As an example, the common problem of a single phase load to be operated from a three phase source. In this instance, by converting the three phase power to direct voltage and inverting back to single phase output, balanced three phase loading is assured on the incoming lines in spite of single phase load variations. Also, phase changing may be combined with instantaneous switching. This may be employed if two three phase inputs, one from commercial power, and one from an engine driven three phase alternator, are used. Other combinations include frequency and voltage stabilization as well as phase changing and instantaneous switching.

Inverters may be employed to stabilize line voltage sources which have wide amplitude fluctuations. The basic device employed to regulate the static inverter output is the ferroresonant regulator. It will accept a wide range of input voltage amplitude and provide an output held constant within a few percent. The use of an inverter for line amplitude stabilization in itself offers no advantage over the direct use of a ferroresonant regulator. It becomes a necessity if coupled with amplitude variation, frequency variation, phase changing, or, if the line to be stabilized is a direct source.

Static inverters may have a frequency stability of almost any accuracy desired. The typical 60 c.p.s. system maintains frequency within ½ c.p.s. Addition of an oscillator standard such as a tuned fork reduces variation to 0.01%. Installations of a stable high frequency crystal standard with a digital dividing system can improve accuracy to four decimal places or so. Increased cost follows the increased accuracy.

A highly efficient direct current transformation method results from utilization of an inverter. A direct source is inverted to a square wave, transformed by means of a transformer and converted back to direct current. This application is most important if a direct source of one voltage is available, while at the same time a significant portion of the load is at a level widely different from the source. A typical application is in the use of logic elements operating with 12 and 24 direct volt input from a 130 direct volt system.

In order to take full advantage of magnetic steel cores, transformers are generally designed to operate from almost full saturation in one direction to almost full saturation in the other direction each half cycle of the supply voltage waveform. During initial start-up of the transformer the flux level is at its residual value which is between the saturation values. If this residual were, for example, to be zero, only about a quarter cycle of the supply voltage may be initially applied. If more were applied, saturation may result, causing large exciting current to flow. This condition is not damaging to the normal commercial power system because the surge currents which result are small compared to the system capacity. Such is not the case with static inverters. The inverter requires the initial energy flow from the power source to be to the commutating capacitor or inductors. This is necessary in order to effect the proper switching at the end of the half cycle. If high exciting currents are required by *any* transformers connected across the output of the static inverter, these currents bypass the commutating capacitor and may cause a malfunction (improper switching from one set of SCR's to the other set. A set may be one or more SCR's).

The above noted inherent problem with static inverters is overcome by the present invention, two innovations employed in the pilot oscillator which "fires" the SCR's. More particularly these innovations are: the oscillator transformer has a gapped core making its residual flux approximately the same as that of any output transformer used across the inverter output, and, initial oscillator frequency for the first few cycles is higher than the normal operating frequency.

The gapped transformer cores permit the residual flux level of the oscillator core to be essentially that of a transformer, relay, solenoid or other magnetic device connected across the inverter output. This, together with the high frequency start, reduces inverter cost, reduces the number of parts required, simplifies servicing, reduces size, eliminates the need for a starting system employing relays, resistors, etc., reduces weight, and provides more reliable starting over varying input voltage and load conditions.

It is accordingly an object of the present invention to provide a new and improved static inverter circuit.

Another object of the invention is to provide an inverter circuit that eliminates the residual flux effects, allowing the initial energy flow from the power source to the commutating capacitor.

A further object of the invention is to provide an inverter circuit that simplifies the circuit and provides reduction in size and cost and yet provides more reliable starting over varying input voltage and load conditions.

Other objects and features of the present invention will become apparent from the following detailed description when taken in conjunction with the drawings in which.

Figure 1:
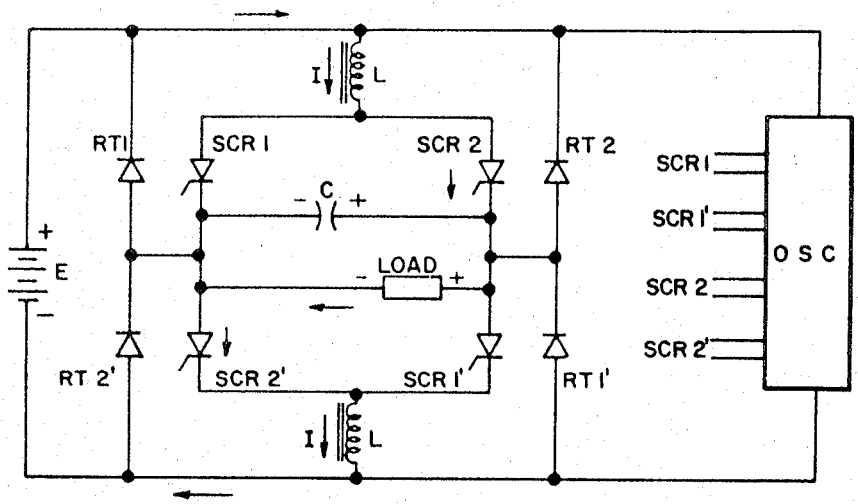
FIGURES 1 and 1A are schematic diagrams of a bridge and center tap inverter circuit illustrated for purposes of understanding the present invention.
Figure 1A:
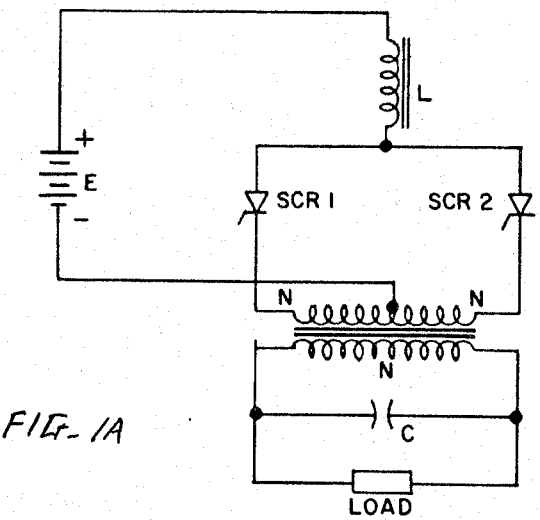

With reference to the bridge inverter circuit of FIGURE 1, a general analysis may be given. In the analysis certain waveform approximations are made and the assumption of a resistive load.

Figure 2:
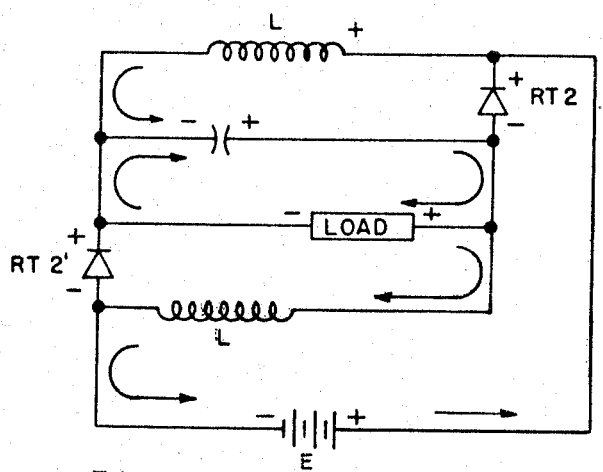
FIGURE 2 is an equivalent circuit to that of FIGURE 1 during turn-off time.

At time equal zero minus, SCR's 2 and 2' are conducting. Currents and voltages are as shown in FIGURE 1. At time equal zero, the gate voltage on SCR's 1 and 1' becomes positive turning them on. The capacitor voltage is applied across SCR's 2 and 2' in a direction to turn them off. It is important that the voltage across these SCR's have this polarity a sufficient length of time to insure that they turn off completely. FIGURE 2 gives the equivalent circuit for the interval of time from time equal zero to the time when the voltage across the capacitor equals zero ("turn off time").

Diodes RT2 and RT2' are reverse biased because the capacitor voltage, for time greater than zero, is less than the supply voltage, E. An assumption of linear voltage decay across the load resistance is made in order to derive the energy transformed to heat by the load. This interval is sufficiently short to make the error due to this assumption small.

A linear change of supply current is also assumed during this interval of time. Since this fact is used to derive the average supply current flow during turn off time, the resulting error is also small.

In the equations set forth hereinafter, the symbol representations are:

C is the capacitance, E is the direct voltage, F is for frequency, 1 is for direct current (FIG. 4), $1_0$ is for peak current during switching (FIG. 4), $1_1$ is for minimum current during switching (FIG. 4), $\underline{i}_0$ is the normalized peak current defined by Equation 7, $\underline{i}_1$ is the normalized minimum current defined by Equation 14, L is for inductance, R is the load resistance, t for time, $t_0$ for time at which $1_0$ occurs, $t_1$ for time at which $1_1$ occurs, $t_s$ the time to reach peak supply current on energizing inverter with no stored energy, E for energy, $E_{0-}$ for energy immediately before switching is initiated (FIGURE 4), $E_d$ for energy dissipated in the load resistance over the time interval $t_0$, $E_{d1}$ for energy dissipated in the load resistance over the time interval $t_1-t_0$, $E_s$ for energy supplied by the source over the time interval $t_1-t_0$, $E_{t0}$ for energy stored in L and C at time, $t_0$, $E_{t1}$ for energy stored in L and C at time $t_1$.

At time equal zero minus, steady state conditions exist. Supply current equals 1 and capacitor voltage equals E. The total energy at this point is expressed by $$E_{0-} = 2\left(\frac{LI^2}{2}\right) + \frac{CE^2}{2} = LI^2 + \frac{CE^2}{2} \quad (1)$$

A time, $t_0$, is now defined as that time when the capacitor voltage reaches zero. At this point, the supply current may be greater than 1 since the energy stored in the capacitor (less than dissipated in the load during the short interval $t_0$) is now stored in the inductors. The supply current at $t_0$ is defined as $1_0$.

Total energy at $t_0$ is $$E_{t0} = 2\left(\frac{LI_0^2}{2}\right) = LI_0^2 \quad (2)$$

Over the interval $t_0$ the energy supplied by the source $E_s$, and that dissipated in the load, $E_d$, are $$E_s = \left(\frac{I+I_0}{2}\right)t_0 \quad (3)$$

and $$E_d = \frac{E}{2}\frac{E}{R}t_0 = \frac{E^2}{2R}t_0 \quad (4)$$

Now by balancing the energy books over the interval $t_0$ we have $$E_0 = E_s - E_d + E_{t0} \quad (5)$$

Combining Equations 1, 2, 3, 4, and 5, $$LI^2 + \frac{CE^2}{2} = \frac{E}{2}(I+I_0)t_0 - \frac{E^2}{2R}t_0 + LI_0^2 \quad (6)$$

Equation 6 may be simplified by expanding, noting that $E=1R$ and defining the normalized current $$\underline{i}_0 = \frac{I_0}{I} \quad (7)$$

The result is $$t_0 = \frac{RC}{\underline{i}_0} - \frac{2L}{R}\left[\underline{i}_0 - \frac{1}{\underline{i}_0}\right] \quad (8)$$

Figure 3:
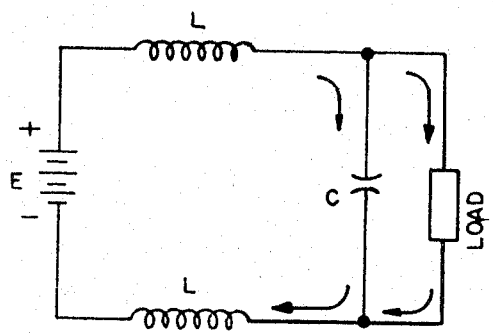
FIGURE 3 is an equivalent circuit to that of FIGURE 1 during turn-off time.

As current continues to flow, the capacitor voltage reverses polarity. At this point, the SCR's 2 and 2' are in the non conducting state, while 1 and 1' are in a conducting state. Energy stored in the inductors, L, is partially transferred to C. The point in time at which the capacitor voltage reaches the supply voltage, E, is designated $t_1$. Any further increase in capacitor voltage will be restricted by the clamp circuit composed of the bridge rectifiers RT1, 1', 2, 2' and the source, E. The source current at time equal $t_1$, is designated $1_1$. FIGURE 3 shows the equivalent circuit for the time interval $t_1-t_0$.

Again, assuming linear capacitor voltage with time, an energy equation may be written, $$E_{t0} = E_{t1} + E_{s1} - E_{d1} \quad (9)$$

where, $$E_{t1} = LI_1^2 + \frac{CE^2}{2} = \text{circuit energy at time } t_1 \quad (10)$$

$$E_{s1} = E\left(\frac{I+I_1}{2}\right)(t_1-t_0) - \text{energy supplied by the source} \quad (11)$$

$$E_{d1} = \frac{E}{2}\frac{E}{R}(t_1-t_0) = \frac{E^2}{2R}(t_1-t_0) - \text{energy dissipated by the load} \quad (12)$$

combining Equations 6, 9, 10, 11, and 12, yields $$\frac{E}{2}(I+I_0)t_0 - \frac{E^2}{2R}t_0 + LI_0^2 = LI_1^2 + \frac{CE^2}{2} + \frac{E}{2}(I+I_1)(t_1-t_0) - \frac{E^2}{2R}(t_1-t_0) \quad (13)$$

Equation 13 may be simplified as before by defining the normalized current $$\underline{i}_1 = \frac{I_1}{I} \quad (14)$$

The resulting equation is $$t_1 = \left[1 + \frac{\underline{i}_0}{\underline{i}_1}\right]t_0 + \frac{2L}{R\underline{i}_1}(\underline{i}_0^2 - \underline{i}_1^2) - \frac{RC}{\underline{i}_1} \quad (15)$$

Combining Equations 8 and 15, we gain an expression for $t_1$, $$t_1 = \frac{RC}{\underline{i}_0} - \frac{2L}{R}\left[\underline{i}_1 + \underline{i}_0 - \frac{1}{\underline{i}_1} - \frac{1}{\underline{i}_0}\right] \quad (16)$$

or $$t_1 = t_0 + \frac{2L}{R}\left[\frac{1}{\underline{i}_1} - \underline{i}_1\right] \quad (17)$$

From Equation 17, we seen that $i_1$ must be less than 1 for finite time interval $t_1-t_0$. Practically, this condition seems assured since there must be some energy dissipated during the transfer of energy from capacitor to inductors and back to capacitors. While the energy dissipation term in the equations allow the possibility of a zero value for an open circuit load, this is a bit of friction since there is resistance in the leads, inductors and capacitor. The mathematical model breaks down at this point, unless we restrict the upper value at R at that value which just accounts for other circuit losses. Generally, this model fault is not important, since magnetic components or fixed loads are almost always connected across the inverter output. In either case, load current cannot go to zero and, thus, the load resistance cannot go to the open circuit value. The assumption is made, however, that the minimum dissipation attributable to the largest load resistance achievable is large compared to other circuit losses.

Figure 4:
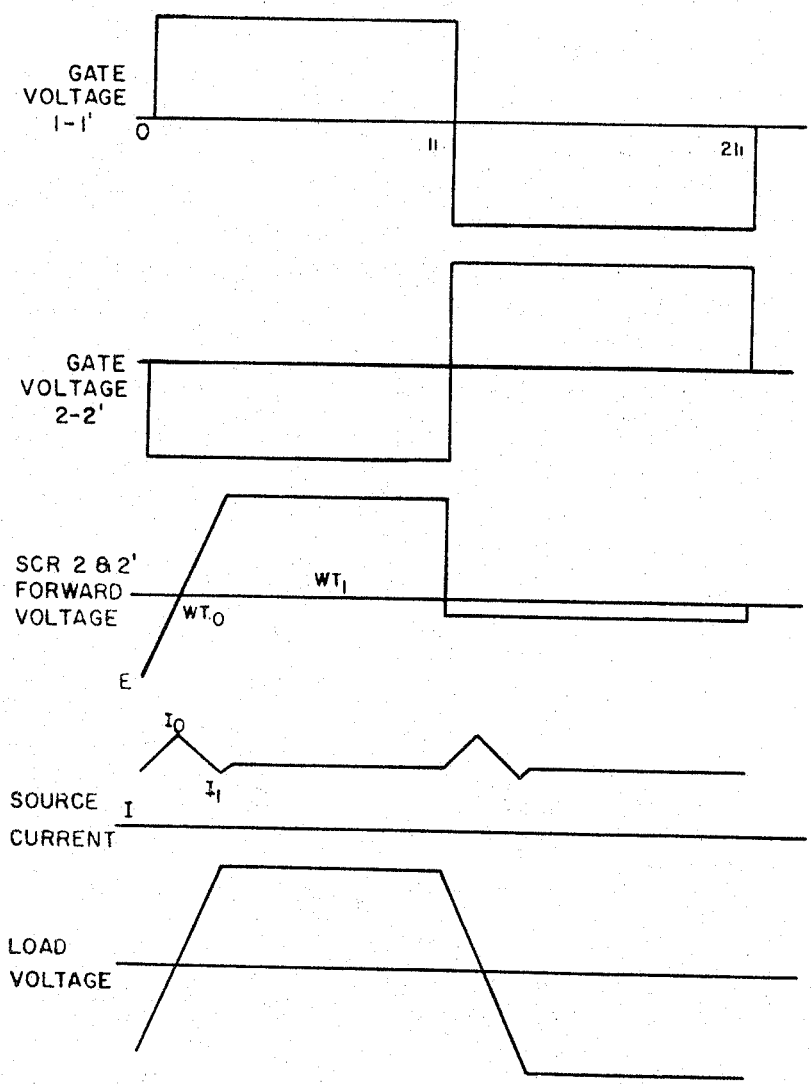
FIGURE 4 is a series of waveforms utilized for understanding the operation of the circuit of FIGURE 1; and, FIGURE 5 is an oscillator circuit in accordance with the present invention.

Waveforms of the circuit operation are shown in FIGURE 4. It should be again noted that this discussion considers only steady state operation.

On first energizing the inverter, no energy is stored in the system components. Thus, the first few cycles may differ from those in steady state operation.

A simple approach to starting the inverter is to consider it as an LC series circuit. The time, $t_s$, at which the peak current is reached for such a circuit is one quarter cycle or $$t_s = \frac{1}{4f} = \frac{\pi}{2W} = \frac{\pi}{2}\sqrt{2LC} \quad (18)$$

At this time, the capacitor voltage is equal to the source voltage. This condition is similar to that which occurs at $t_1$, except that the peak current is defined by the resistance as well as L and C. In any event, the current is at a sufficiently high value to insure ample energy storage in the inductors. The clamp circuit will maintain this voltage by allowing the "surplus" current to flow back to the source.

The start up conditions described approximate those that exist in the interval $t_1-t_0$. Thus, this condition yields a relationship between L and C. If $$t_s = t_1 - t_0 \quad (19)$$

then from Equations 17, 18, and 19

$$\frac{\pi}{2}\sqrt{2LC} = \frac{2L}{R}\left[\frac{1}{i_1} - i_1\right]$$

or $$RC = \frac{4}{\pi^2}\left[\frac{1}{i_1} - i_1\right]\frac{2L}{R} \quad (20)$$

Combining Equations 8 and 20, we may express $t_0$ in terms of the inductance and resistance, or $$t_0 = \frac{2L}{R}\left\{\frac{4}{\pi^2 i_0}\left[\frac{1}{i_1} - i_1\right] - \left[i_0 - \frac{1}{i_0}\right]\right\} \quad (21)$$

In like manner, $$t_1 = \frac{2L}{R}\left\{\frac{4}{\pi^2 i_0}\left[\frac{1}{i_1} - i_1\right]^2 - \left[i_0 - \frac{1}{i_0}\right] + \left[\frac{1}{i_1} - i_1\right]\right\} \quad (22)$$

Equations 20 and 21 provide the necessary information for design. The turn off time, $t_0$, and the peak current, $1_0$ are defined on selection of the silicon controlled rectifiers. Load resistance and current are application conditions.

In most practical cases, the inverter load may not be assumed purely resistive. Thus, the extension of this case into the complex region is important.

The effects of additional shunt capacity in the load may be easily visualized from the previous analysis. This capacitance is in parallel with the commutating capacitance, and thus serves to increase it. If this load characteristic exists, it allows the designer to use less (or no) external capacitance for commutation.

A more difficult assumption is that of series inductance in the load. The effect of this condition may be seen by referring to FIGURE 2 or 3. During the turn off time, $t_0$, energy stored in the load inductance causes current to flow in a direction to charge the commutating capacitor in the reverse direction. Thus, "turn off time" is reduced. A simple solution to this problem is to use a larger commutating capacitor to compensate for the load inductance.

Shown in FIGURE 5 is the schematic wiring diagram for the square wave oscillator. The oscillator is separated into its component parts—voltage regulator, oscillator, and oscillator amplifier on the schematic. The frequency of the oscillator is stabilized by the stabilization of the input voltage at input 1 and 2. A double Zener diode D1 and D2 shunt regulator is used to provide a constant input voltage. Any remaining frequency drift is due to changing emitter collector saturation voltage of TR1 and TR2, change of Zener characteristics with temperature and changing resistance of the transformer T1 due to changing temperature.

In operation of the oscillator circuit at initial turn-on, capacitor C6 serves to bypass D7 and R2 and apply a higher than normal voltage to the transistors TR1 and TR2 feeding the saturating core transformer T1. Diode D2 prevents D7 from clamping this initial voltage surge. The higher voltage on the saturating transformer T1 causes the saturating frequency to increase. The return to normal frequency follows an exponential curve as the capacitor reaches full charge.

The free running oscillator consists of transistors TR1 and TR2, transformer T1 and base feedback resistors R3, R4, VR1 and VR2. TR1 is biased on slightly by R1 and C3 on application of the voltage. Current flows through TR1 to excite transformer T1. The feedback winding supplying emitter base voltage to TR1 is excited turning TR1 on full. TR1 remains closed until the transformer saturates. On saturation, the energy stored in the after saturation inductance and lack of coupling attributable to the reduction of incremental permeability causes a reversal of winding polarity. TR2 is thus closed by application of the proper polarity emitter-base voltage and in like manner TR1 is opened. The oscillation once started is self perpetuating.

TR3 and TR4 plus base resistors R5 and R6 and transformer T2 form the oscillator amplifier. The amplifier isolates the oscillator from the load as well as providing power amplification. The voltage supply for the amplifier is higher than that for the oscillator.

Frequency adjustment is provided by the adjustable resistors VR1 and VR2 in the base circuit of TR1 and TR2. Varying the base resistance varies the point at which switching occurs in the oscillator stage thus varying the frequency.

The oscillator transformer T1 has been so constructed that its core provides a gap. In this way residual flux is approximately the same as that of the output transformer used across the inverter output.

In the preferred embodiment the current drain for the square wave oscillator is about one ampere. Approximately twenty-four volts are required. In some cases where the supply voltage is in excess of twenty-four volts, a relay is employed to reduce loss. This reduction is affected by converting a small amount of inverter output power to operate the oscillator. This power is much less than that supplied by the higher potential input line. The relay serves to disconnect the input source after the inverter has started.

What is claimed is:

1. A static inverter circuit utilizing a converter circuit, an input filter, a square wave oscillator, a power switching amplifier, and a ferroresonant regulator, the improvement in said oscillator comprising a first and second transistor circuit, a saturable transformer, and connecting resistive circuits in feedback relationship; said amplifier comprising said feedback resistive circuits, second pair of transistor circuits, a second connecting resistive circuit, and output transformers connected across said transistors, said second resistive circuits connected to said first pair of transistors, means for applying an input voltage to said oscillator of a magnitude less than that coupled to the input of said amplifier, and further means for increasing the starting frequency of said oscillator circuit at a level higher than said running frequency.

2. A static inverter circuit as set forth in claim 1 wherein said last named means for increasing said starting frequency comprises applying a higher starting voltage to said oscillator.

3. A static inverter circuit utilizing a converter circuit, an input filter, a square wave oscillator, a power switching amplifier, and a ferroresonant regulator, the improvement in said oscillator comprising a first and second transistor circuit, a saturable transformer, and connecting resistive circuits in feedback relationship; said amplifier comprising said feedback resistive circuits, second pair of transistor circuits, a second connecting resistive circuit, and output transformers connected across said transistors, said second resistive circuits connected to said first pair of transistors, means for applying an input voltage to said oscillator of a magnitude less than that coupled to the input of said amplifier, means for matching the level of the residual flux of said saturable transformer to essentially that of said output transformer and wherein said means includes providing a gap in the core of said saturable transformer material thereby assuring that the residual flux before start-up is not plus or minus saturation but at some point essentially zero flux density, and means for increasing the starting frequency of said oscillator circuit at a level higher than said running frequency.

4. A static inverter circuit as set forth in claim 3 wherein said means includes providing a gap in the core of said saturable transformer material thereby assuring that the residual flux before start-up is not plus or minus saturation but at some point essentially zero flux density, and means for increasing said starting frequency comprises applying a higher starting voltage to said oscillator.

References Cited

UNITED STATES PATENTS 3,020,491  2/1962  Kurtz _____ 331—113.1

OTHER REFERENCES

Motorola application Notes, AN 105, June 1960, by Roehr.

JOHN KOMINSKI, *Primary Examiner.*